ANGLE TYPE SWIVELLING CORD GRIP

Original Filed Oct. 8, 1963 2 Sheets-Sheet 1

INVENTORS
GUNTHER S. GRIESHABER
ROBERT J. O'MARA
HENRY GEORGE
BY Fred L. Witherspoon, Jr.
Fred. E. Shoemaker
ATTORNEYS

ANGLE TYPE SWIVELLING CORD GRIP

Original Filed Oct. 8, 1963 2 Sheets-Sheet 2

INVENTORS
GUNTHER S. GRIESHABER
ROBERT J. O'MARA
HENRY GEORGE
BY Fred L. Witherspoon, Jr.
Fred E. Shoemaker
ATTORNEYS United States Patent Office Re. 26,295
Reissued Nov. 7, 1967

26,295

ANGLE TYPE SWIVELLING CORD GRIP

Gunther S. Grieshaber, Camilus, Robert J. O'Mara, Liverpool, and Henry George, Syracuse, N.Y., assignors to Pass & Seymour, Inc., Syracuse, N.Y., a corporation of New York Original No. 3,209,306, dated Sept. 28, 1965, Ser. No. 314,762, Oct. 8, 1963. Application for reissue Sept. 30, 1966, Ser. No. 589,164
10 Claims. (Cl. 339—103)

Matter enclosed in heavy brackets [ ] appears in the original patent but forms no part of this reissue specification; matter printed in italics indicates the additions made by reissue.

This invention relates to cord or cable grips for attachment plugs or connectors and more particularly to such grips which are angled to deflect the cord or cable substantially right angles to the axis of insertion of the plug or connector.

It is a general object of the present invention to provide a novel cord or cable grip for attachment plugs and connectors.

An important specific object of the invention consists in the provision of a cord or cable grip for an attachment plug or connector device arranged to deflect the cable substantialy normal to the axis of insertion of the separable contacts of the device and in which the orientation of the cable in respect to a plane through the two major contacts of the device may be chosen and fixed.

Another important object of the invention consists in the provision of angled swivel type cable grip constructed to be accepted and mounted in the usual slots in the insulation body and beneath the metal cover therefor as provided for axial type cable grips.

Still another important object of the invention resides in the sectional construction of the grip including two tang parts each having a arcuate, outwardly flared partcircular neck, and angled deflecting clamp section having a portion adapted for swivelling on and clamping to the said neck parts along with a half cable grip and finally an arcuate cable grip unit attached and adjustable in respect to the said half cable grip on the deflecting section for engaging the cable.

An important feature of the invention resides in the configuration of the several parts for manufacture by stamping from sheet metal.

Other and further objects and features of the invention will be more apparent to those skilled in the art upon a consideration to the following specification and the accompanying drawings wherein is disclosed a single exemplary embodiment of the invention with the understanding that such changes and modifications may be made therein as fall within the scope of the appended claims without departing from the spirit of the invention.

Attachment plugs, or caps as they are sometimes termed, are used in connecting a conductor cord or cable to a wall or similar outlet receptacle for completing an electric circuit to a portable or semi-permanent device when such plugs are constructed for heavy duty usage with either heavy plastic covered conductor cords or cables or the so-called BX armored cables they are usually equipped with some form of clamping means or "cord grip" whereby any mechanical stress on the cable is not transmitted to the individual conductors where they are attached electrically to the blades of the attachment plug. Most heavy duty plugs or caps are armored, i.e., most of the electrical and insulation parts are encased in or are protected by a metal cover or plate which is centrally perforated for the passage of the conductor cord to the terminals.

In order to provide this armored type of cap with a cable clamp, the rear flat face of the insulation block of the cap is grooved radially outwardly from the hole in two directions 180 degrees apart to provide channels to each to receive a tab or tang, the inner end of which is formed into a part-cylindrical cable clamp member which extends through the central opening in the armor plate covering the rear face of the insulation block. The tangs are slidable longitudinally in their grooves so that the two half cable clamps, with their laterally extending tabs, which are perforated and threaded for the reception of tightening screws, may be clamped about the conductor sheath to relieve tension on the terminals. This type of cable clamp provides for axial extension of the conductor from the rear face of the cap and if the conductor is relatively heavy it imposes quite a load on the cap prongs and the receptacle for them, if it is desired to extend the cord generally in a direction parallel to the surface on which the receptacle is mounted.

It is, therefore, one of the principal purposes of the present invention to provide an angle mounted cable clamp which can be rotated in respect to the cap to allow the conductor cord to extend substantially radially therefrom with any desired orientation either automatically by a swivelling action resulting from movement of the cord or by a fixed connection after a determination of the desired direction of cord extension.

The first embodiment of the present invention is adapted for mounting on an attachment plug or cap having tang grooves in its upper face and an armored cover over them as previously used with clamps for axial conductors.

Figure 1:
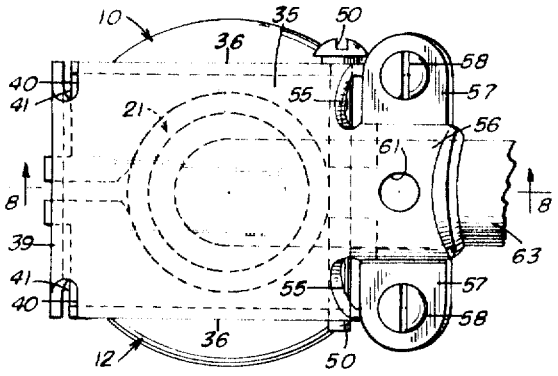
FIGURE 1 is a top plan view of the angle type cord grip assembled on an armored attachment plug with a cord attached.
Figure 2:
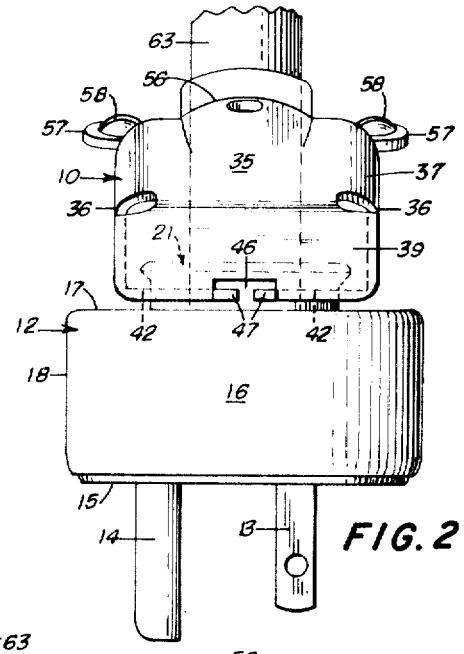
FIGURE 2 is an end elevation thereof.
Figure 3:
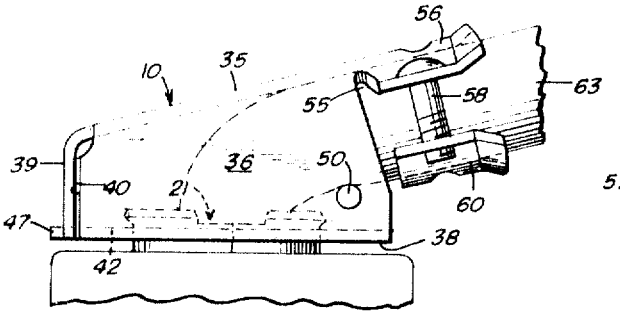
FIGURE 3 is a side elevation thereof.

Referring now to the drawings, FIGURES 1, 2 and 3 show the cord gripping angle swivel device 10 attached to a more or less conventional heavy duty attachment plug or cap 12, seen in elevation in FIGURE 2, and including the customary contact blades 13 and grounding prong 14 projecting forwardly from the front face of the insulating body 15 in the nature of a circular disc. This disc is shown encased in metal armor 16 having a flat top plate 17 and a skirt 18, although as often constructed it may have only the flat top cover plate attached by means of screws or rivets to the insulation block.

Figure 5:
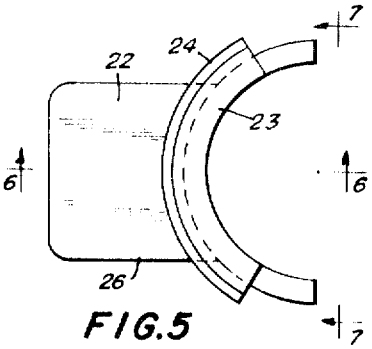
FIGURE 5 is a top plan of one of the two neck elements and its tang.
Figure 6:
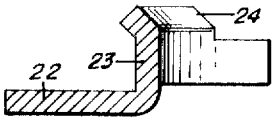
FIGURE 6 is a vertical section through the same taken on line 6—6 of FIGURE 5.
Figure 7:
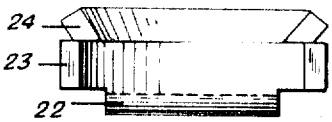
FIGURE 7 is an elevation thereof looking in the direaction of the arrows 7—7 of FIGURE 6.
Figure 8:
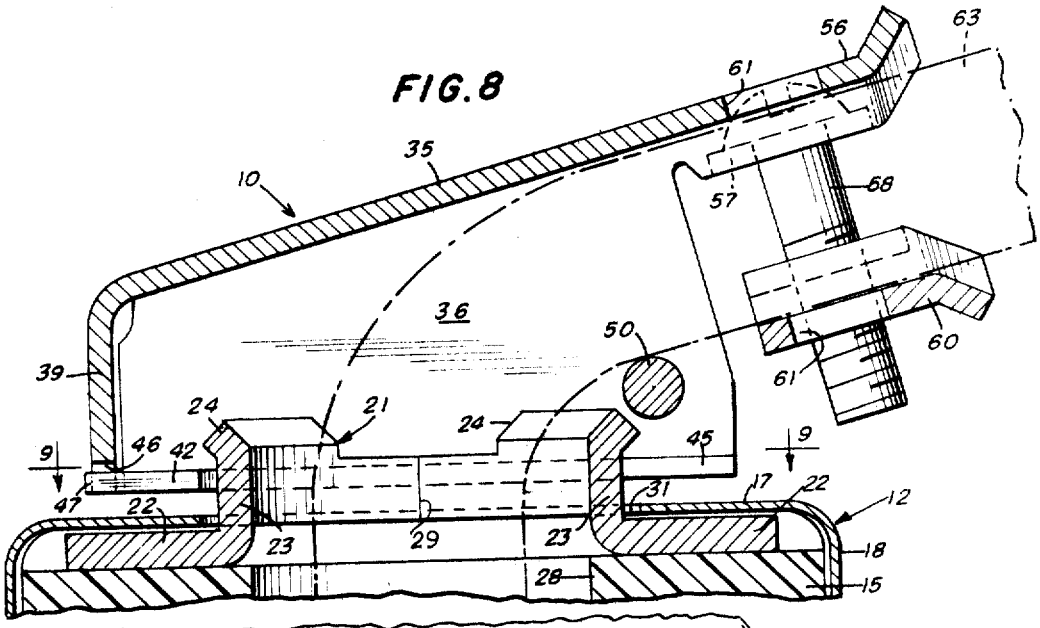
FIGURE 8 is a central vertical section through the angle cord grip and its attachment plug taken on line 8—8 of FIGURE 1 to show the cooperation of the parts.
Figure 9:
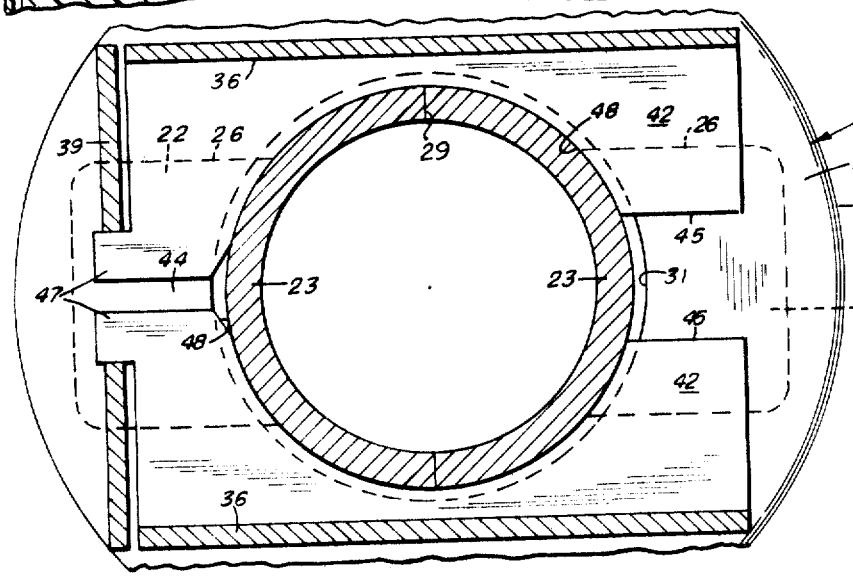
FIGURE 9 is a horizontal section thereof taken on line 9—9 of FIGURE 8 looking in the direction of the arrows.

As seen in FIGURE 8, the cord grip unit 10, shown with the plug in vertical section, is attached to the plug or cap by means of a neck unit 21 secured to the latter and composed of two identical parts as seen in FIGURES 5, 6 and 7, each struck up from heavy sheet metal and including a flat rectangular tab 22 and a half cylindrical neck portion 23, at least a portion of which is extended by an outwardly flared lip 24 best seen in FIGURES 6 and 8. The semi-cylindrical tubular portions 23 mate as shown in FIGURE 9, and the tabs 22 extend in opposite directions and are received in channels 26 radially extending in the top face of the insulation block 15 from the central cord passage 28 therethrough. The channels are just slightly deeper than the thickness of tabs 22 and closely hold these tabs along their side edges. The arcuate parts substantially abut each other as at 29 to complete a tubular extension of the central hole in the insulation block. The flaring portions provide what may be termed a groove around the outside of this extension of the hole for purposes to be later described. It will be noted in FIGURE 8 that the tabs 22 are held in position in their slots 26 in block 15 by the cover 17 of the armor which overlies them and is apertured at 31 for the passage of the parts 23.

Except for the shape of the parts 23 and 24 the two units shown in FIGURES 5, 6 and 7 are quite similar to the usual cable clamps provided in many armored caps, and this is because the armor and the grooved insulation blocks are already available as manufactured for caps having the axial cable clamps arrangements, and the present tabs 22 are received in the same type and size slot and covered by the same type armor plate, thereby facilitating and cheapening the manufacture and permitting interchangeability.

The cable of cord grip unit 40 which deflects the cord to an angle of nearly 90 degrees to the axis of the hole 28 in the insulation block 15 is adapted to be mounted and cooperate with the grooved portion produced by the flares 24 on the neck units 23, and is illustrated in FIGURES 1 to 4 and 8 in considerable detail. Except for one small clamp unit it is formed integrally from a single sheet of suitable rust proofed metal, stamped and formed to the box-like configuration shown in the first four figures. Thus, it includes a substantially rectangular flat top or cover sheet 35 from the parallel edges of which integrally depend the two substantially parallel side plates 36 of trapezoidal shape, the inclined edge 37 of each side plate being integral with one of the edges of the cover plate 35 so that when the lower edges 38 of these side plates are substantially parallel to the armor cover 17 of the attachment plug the cover plate 35 extends a few degrees less than parallel to this armor plate in order to deflect the cord through an angle of just slightly less than 90 degrees resulting from its bearing on the undersurface of this deflector plate.

A short rear plate 39 serves to close the low side and is of such a width that it overlaps the short edges 40 of the side plates as clearly seen in FIGURE 1. For convenience in forming the slight clearance, openings 41 may be formed in the blank before bending.

The box-like swivel unit 10 is also closed at the bottom by a plate formed in two parts each numbered 42. Each part is integral with and bent inwardly from the lower edge of the corresponding side member 36 and the inner edges of these parts do not quite abut at the end adjacent the rear wall as seen at 44 in FIGURE 9 while at the front they are even more widely spaced apart as seen at 45. Between these parts each inner edge is provided wth a substantial semi-circular notch 48.

Figure 4:
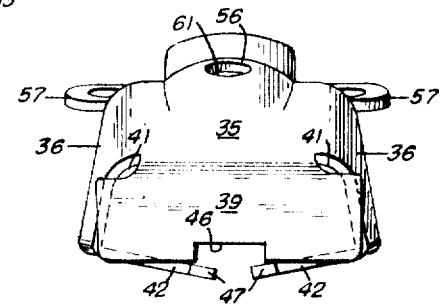
FIGURE 4 is an end elevation of the angled swivel cord grip before assembly on an appropriate attachment plug having a neck for the purpose.

For purposes of holding the parts rigidly assembled into a box the lower edge of the rear wall 39 is provided with a rectangular notch 46 and each of the half bottom plates 42 at its rear edge and adjacent the facing edges is fitted with an integral tang 47, the sizing being such that after the parts are initially bent to the position illustrated in FIGURE 4 which permits assembly of notches 48 over the tube 23, the sides may be pressed more closely together and the tangs pushed into the notch 46, by bending of the junctions of 36 and 42, where they will hold the part 10 loosely assembled on the neck. The notches 48 are sized to very closely engage the walls 23 of tube 21 when the tangs 47 are fitted in the notch 46 as seen in FIGURE 2. Under this condition, however, the size of the composite circular opening in the base plate is just as to make it an easy fit in the neck 21 permitting swivelling of the deflector unit thereon. Some users may prefer this so that the cord may be drawn off in various directions with the swivel unit following, but in most instances it is desired to secure the swivel unit rigidly to the neck and this is achieved by tightenting the screw 50, the head of which is shown at the top in FIGURE 1 passing through an aperture in the lower left corner of the upper side plate and threadedly engaged into an opening 51 correspondingly positioned in the other side plate. Thus, the side walls may be drawn together sufficiently to clamp the neck between the edges of the half circular notches and consolidate and rigidify the whole assembly after proper adjustment of deflector angle is made.

The cover plate 35 is reduced in width where it extends to the right beyond the edges of the side plate 36 by means of the notches 55 and the extending portion thus afforded is transversely curved at 56 to approximately the radius of the cable which is to be used with it, and is fitted with integral, laterally extending tabs 57 one on either side which are perforated to receive screws 58 for cable clamping purposes. These screws cooperate with the separate clamp part 60 not substantially different in shape from the projection 56 and its tabs 57. The tabs on the portion 60 are drilled and threaded to accept the screws 58, whereby a complete cable clamp is formed, in order that the separate clamp member 60 may be drawn up against the undersurface of the cable to clamp it tightly against the part 56. In order to insure against slippage, in case the cable cover surface is slippery, both the extension 56 and the clamp member 60 are provided with apertures 61 through which any plastic types or other cable sheath will project slightly to increase the effective holding qualities of the cable clamp.

In FIGURE 8 the dotted outline of a relatively small cable 63 shows how it is deflected by the cover plate 35 to change from an axial direction as it emerges through the neck portion 23 to a position almost at right angles thereto. Obviously the cable may have a diameter which is the maximum to fit the interior opening in the neck and the cable clamp is adjustable to accept this, or an even smaller cord than the cable shown.

Figure 10:
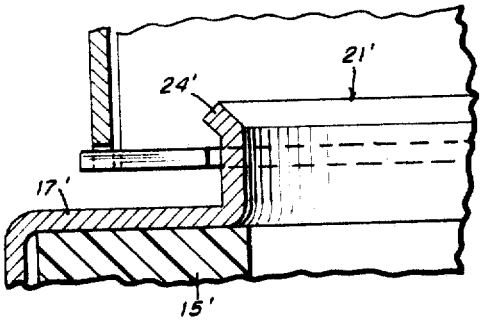
FIGURE 10 is a fragmentary central vertical section similar to FIGURE 8 but showing a modification in which the swivel supporting the neck is integral with the plug armor.

Under circumstances where attachment plug insulation blocks are not readily available in their pre-grooved condition as used for axially extending cable clamps, the device can be somewhat simplified, as shown in FIGURE 10, by forming the neck 21', integral with the armor cover plate 17'. Here it may be continuous and in one piece including the flare 24' by being stamped or formed from the metal of the armor where it must be removed anyhow to provide the central opening. The remaining parts are identical with those already described and the performance is the same.

We claim:

1. An angle type cord grip for use with a cord connector or cap [having] *comprising* a body of insulating material with a substantially flat back and a central cord passage therethrough, said body having two oppositely disposed, parallel sided channels in its rear face, an armor plate secured to said body to cover the back and channels and having a perforation aligned with said passage, a pair of metal strap retainers each having a tab fitted in one of said channels and a semi-cylindrical portion forming an extension of said passage, means on said portions projecting through said perforation and each having a flared outer edge, a sheet metal angle swivel unit, parts integral with said unit and together having an opening whose edges engage said retainers below said flares, means to clamp said edges against said retainers after rotational adjustment thereon, said unit having a deflecting wall terminating in a cord inlet port whose axis is nearly at right angles and radial to the axis of said cord passage, and adjustable means for cooperation with the port area of said wall for gripping a cord entering said unit and passage.

2. An angle type cord grip for use with a cord connector or cap [having] *comprising* a body of insulating material, terminals on said body, armor extending over the rear of said body and having a central cord aperture therein, flared neck means extending axially from around said aperture, [a sheet metal] *an* angle swivel unit having a two part wall, matching notches in the facing edges of said parts adapted for engagement over the said flared neck to adjustably connect the swivel unit to said armor, means to contract said two parts of said wall to clamp the notches to said neck to prevent relative rotation, a second wall on said unit overhanging said cord aperture to deflect a cord connected to said terminals laterally of the aperture axis, a curved lip on said wall, a separate clamp member curved to cooperate with said lip to clamp a cord thereto and means adjustably attaching said clamp member to said lip.

3. The cord grip as defined in claim 2 in which said flared neck is formed in two parts each having a tab fitting in a slot in the rear face of said body, said armor covering said slots and tabs to hold the latter in position.

4. The cord grip as defined in claim 2 in which the said flared neck is formed integral with the armor and extends outwardly from the edges of the cord aperture therein.

5. An angle type swivelling cord grip for use with a neck having an external groove and [extending] *surrounding* a cord hole in an electric fitting, in combination, a one-piece [sheet metal] unit including a cord deflecting cover, a pair of side walls depending from opposite edges of said cover, a half wall extending at right angles from the bottom of each side wall so as to substantially meet midway between said bottoms, said half [walls] *walls* having facing edges and cooperating substantially half circular notches extending inwardly from said edges sized to jointly fit over and swivel in said neck groove, means connecting said side walls for moving the half walls toward each other to draw the notch edges against the neck to clamp the unit [non-rotatively] thereto, and a separate clamp strap mounted beneath said deflecting cover for clamping movement toward the same to grip a cord entering the unit and passing through the neck.

6. An angle type swivelling cord grip for use with a neck having an external groove and [extending] *surrounding* a cord hole in an electric fitting, in combination, a one-piece [sheet metal] unit of box-like configuration including a bottom wall having a perforation sized to fit over said neck and longitudinally divided into two similar parts each containing half of said perforation, a pair of parallel side walls extending upwardly from the outer edges of said bottom wall parts, a cord deflecting cover joining the upper edges of said side walls and being inclined at less than 90 degrees to the axis of said cord hole, a rear wall depending from the lower of the remaining edges of the cover, the higher cover edge being extended outwardly beyond the sides and widened into tabs, perforations in said tabs, a separate clamp piece for cooperation with said cover extension and screws extending through said tab-perforations and threaded into said clamp piece.

7. The cord grip as defined in claim 6 in which means are provided for adjusting the parts of the bottom wall toward each other to grip the neck to prevent relative rotation of the unit and neck.

8. An angle type swivelling cord grip for mounting on an externally grooved neck [extending] *surrounding* a cord hole in an electric fitting, in combination, a unit formed of one piece of sheet metal having a cord deflecting generally rectangular cover, a pair of generally trapezoidal side walls depending by their inclined edges from and integral with opposite parallel edges of said cover, a bottom wall extending substantially between and integral with the opposite edges of said side walls, said cover being divided in two along a line parallel to said side walls providing facing edges each with a substantial semicircular notch, said notches jointly sized to closely engage the said neck groove, a rear wall integral with the rear edge of said cover and depending over the rear edge of said bottom wall, lugs extending parallel to said facing edges and extending them beyond the rear edge of the bottom wall, a notch in said rear wall sized to receive said lugs to hold the bottom wall parts together, a screw extending through one and threaded into the other of the said side walls forwardly of said notches and near the bottom wall to draw the bottom wall parts together to clamp the notch edges about the neck to prevent relative rotation, an integral forward extension on said cover shaped as half of a cord clamp, and a separate cord clamp part secured adjustable to the integral extension to cooperate therewith to clamp a cord extending beneath said cover and into said cord hole.

9. The angle type cord grip of claim 8 in which said grooved neck is formed integrally with an armor part of an electric fitting.

10. The angle type cord grip of claim 8 in which said grooved neck is composed of two semi-circular parts, a tang on each neck part extending radially outwardly therefrom, said tangs being positioned and sized to fit in standardized grooves in an attachment plug insulation body and beneath a centrally perforated armor plate covering the rear face of said body.

References Cited

UNITED STATES PATENTS

The following references, cited by the Examiner, are of record in the patented file of this patent or the original patent.

| | | | |
|---|---|---|---|
| 2,065,297 | 12/1936 | Wiechers | 285—179 |
| 2,326,181 | 8/1943 | Sundquist et al. | 339—103 |
| 3,137,536 | 6/1964 | Healy | 339—103 |

RICHARD E. MOORE, *Primary Examiner.*